(12) United States Patent
Garland

(10) Patent No.: US 9,892,028 B1
(45) Date of Patent: Feb. 13, 2018

(54) SYSTEM AND METHOD FOR DEBUGGING OF WEBCASTING APPLICATIONS DURING LIVE EVENTS

(75) Inventor: Harry B. Garland, San Francisco, CA (US)

(73) Assignee: ON24, Inc., San Francisco, CA (US)

( * ) Notice: Subject to any disclaimer, the term of this patent is extended or adjusted under 35 U.S.C. 154(b) by 1072 days.

(21) Appl. No.: 12/122,153

(22) Filed: May 16, 2008

(51) Int. Cl.
*G06F 9/44* (2006.01)
*G06F 11/36* (2006.01)

(52) U.S. Cl.
CPC ...... *G06F 11/3688* (2013.01); *G06F 11/3664* (2013.01); *G06F 11/3684* (2013.01)

(58) Field of Classification Search
CPC ........... G06F 17/30221; G06F 11/3466; G06F 11/3636
USPC ........... 717/124–135; 714/15–24, 37–39, 48, 714/799–824; 709/203–231
See application file for complete search history.

(56) References Cited

U.S. PATENT DOCUMENTS

| | | | |
|---|---|---|---|
| 5,220,665 A | 6/1993 | Coyle, Jr. | |
| 5,388,197 A | 2/1995 | Rayner | |
| 5,420,801 A | 5/1995 | Dockter et al. | |
| 5,557,796 A * | 9/1996 | Fehskens et al. | 712/220 |
| 5,642,171 A | 6/1997 | Baumgartner et al. | |
| 5,680,619 A | 10/1997 | Gudmundson et al. | |
| 5,732,216 A | 3/1998 | Logan et al. | |
| 5,748,185 A | 5/1998 | Stephan et al. | |
| 5,801,685 A | 9/1998 | Miller et al. | |
| 5,815,154 A | 9/1998 | Hirschtick et al. | |
| 5,838,973 A | 11/1998 | Carpenter-Smith et al. | |
| 5,861,906 A | 1/1999 | Dunn | |
| 5,892,915 A | 4/1999 | Duso et al. | |
| 5,929,850 A | 7/1999 | Broadwin | |
| 5,996,015 A | 11/1999 | Day | |
| 6,008,807 A | 12/1999 | Bretschneider et al. | |
| 6,009,458 A | 12/1999 | Hawkins et al. | |
| 6,014,706 A | 1/2000 | Cannon | |
| 6,058,424 A | 5/2000 | Dixon | |
| 6,097,441 A | 8/2000 | Allport | |
| 6,108,645 A | 8/2000 | Eichstaedt et al. | |
| 6,141,595 A | 10/2000 | Gloudeman et al. | |
| 6,155,840 A | 12/2000 | Sallette | |
| 6,157,809 A | 12/2000 | Kaqmbayashi | |
| 6,223,292 B1 | 4/2001 | Dean et al. | |

(Continued)

FOREIGN PATENT DOCUMENTS

| | | |
|---|---|---|
| WO | WO 02082815 | 10/2002 |
| WO | WO 02093352 | 11/2002 |
| WO | WO 02097616 | 12/2002 |

OTHER PUBLICATIONS

Abla, G. et al, "Advanced Tools for enhancing control room collaborations"—Fusion Engineering and Design, vol. 81, Issues 15-17, 5th IAEA TM on Control, Data Acquisition, and Remote Participation for Fusion Research—5th IAEA TM, Jul. 2006, pp. 2039-2044, ISSN 0920-3796, DOI: 10.1016/j.jusengdes.200.

(Continued)

*Primary Examiner* — John Chavis
(74) *Attorney, Agent, or Firm* — DLA Piper LLP (US)

(57) ABSTRACT

A system and method for debugging of live webcasting applications during live events is disclosed. The debugging system permits a user to quickly locate errors in real time during time sensitive webcasting where it is imperative to find and fix errors before the conclusion of the live event.

14 Claims, 7 Drawing Sheets

(56) References Cited

U.S. PATENT DOCUMENTS

| | | | |
|---|---|---|---|
| 6,253,368 B1* | 6/2001 | Nelin et al. | 717/124 |
| 6,324,683 B1* | 11/2001 | Fuh et al. | 717/124 |
| 6,396,500 B1 | 5/2002 | Qureshi et al. | |
| 6,404,978 B1 | 6/2002 | Abe | |
| 6,452,609 B1 | 9/2002 | Katinsky et al. | |
| 6,523,022 B1 | 2/2003 | Hobbs | |
| 6,535,909 B1 | 3/2003 | Rust | |
| 6,538,665 B2 | 3/2003 | Crow et al. | |
| 6,601,026 B2 | 7/2003 | Appelt et al. | |
| 6,628,279 B1 | 9/2003 | Schell et al. | |
| 6,629,065 B1 | 9/2003 | Gadh et al. | |
| 6,636,237 B1 | 10/2003 | Murray et al. | |
| 6,636,888 B1 | 10/2003 | Bookspan et al. | |
| 6,657,543 B1 | 12/2003 | Chung | |
| 6,697,805 B1 | 2/2004 | Choquier et al. | |
| 6,714,909 B1 | 3/2004 | Gibbon et al. | |
| 6,715,126 B1 | 3/2004 | Chang et al. | |
| 6,728,753 B1 | 4/2004 | Parasnis et al. | |
| 6,745,344 B1* | 6/2004 | Joshi et al. | 714/38.11 |
| 6,801,224 B1 | 10/2004 | Chang et al. | |
| 6,834,308 B1 | 12/2004 | Ikezoye et al. | |
| 6,842,175 B1 | 1/2005 | Schmalstieg et al. | |
| 6,859,838 B1 | 2/2005 | Puranik et al. | |
| 6,920,181 B1 | 7/2005 | Porter | |
| 7,062,722 B1 | 6/2006 | Carlin et al. | |
| 7,079,990 B2 | 7/2006 | Haller et al. | |
| 7,096,416 B1 | 8/2006 | Smith et al. | |
| 7,103,770 B2 | 9/2006 | Conrath | |
| 7,146,329 B2 | 12/2006 | Conkwright et al. | |
| 7,168,035 B1 | 1/2007 | Bell et al. | |
| 7,290,057 B2 | 10/2007 | Suanders et al. | |
| 7,296,137 B2* | 11/2007 | Moyer | 711/205 |
| 7,313,595 B2 | 12/2007 | Rust | |
| 7,330,875 B1 | 2/2008 | Parasnis et al. | |
| 7,349,944 B2 | 3/2008 | Vernon | |
| 7,350,231 B2 | 3/2008 | Madison et al. | |
| 7,363,372 B2* | 4/2008 | Potenzone et al. | 709/225 |
| 7,370,269 B1 | 5/2008 | Prabhu et al. | |
| 7,415,529 B2 | 8/2008 | Saunders et al. | |
| 7,418,431 B1* | 8/2008 | Nies et al. | 706/21 |
| 7,441,201 B1 | 10/2008 | Printezis | |
| 7,454,708 B2 | 11/2008 | O'Neal et al. | |
| 7,559,055 B2* | 7/2009 | Yang et al. | 717/127 |
| 7,711,722 B1 | 5/2010 | Sahasi et al. | |
| 7,712,052 B2 | 5/2010 | Szeliski et al. | |
| 7,873,638 B2 | 1/2011 | Young et al. | |
| 8,392,821 B2 | 3/2013 | DeMarco et al. | |
| 8,682,672 B1 | 3/2014 | Ha et al. | |
| 8,682,969 B1 | 3/2014 | Sahasi et al. | |
| 8,706,812 B2 | 4/2014 | Sahasi et al. | |
| 9,046,995 B2 | 6/2015 | Garland | |
| 9,148,480 B2 | 9/2015 | Sahasi et al. | |
| 2001/0027420 A1 | 10/2001 | Boublik et al. | |
| 2001/0032242 A1 | 10/2001 | Terahama et al. | |
| 2001/0032305 A1* | 10/2001 | Barry | 712/34 |
| 2002/0016788 A1 | 2/2002 | Burridge | |
| 2002/0026323 A1 | 2/2002 | Sakaguchi et al. | |
| 2002/0065635 A1 | 5/2002 | Lei et al. | |
| 2002/0078150 A1 | 6/2002 | Thompson et al. | |
| 2002/0085029 A1 | 7/2002 | Ghani | |
| 2002/0087496 A1 | 7/2002 | Stirpe et al. | |
| 2002/0107673 A1 | 8/2002 | Haller et al. | |
| 2002/0112155 A1 | 8/2002 | Martherus et al. | |
| 2002/0112247 A1 | 8/2002 | Horner et al. | |
| 2002/0122050 A1* | 9/2002 | Sandberg | 345/705 |
| 2002/0133719 A1 | 9/2002 | Westerdal | |
| 2002/0143901 A1 | 10/2002 | Lupo et al. | |
| 2002/0152278 A1* | 10/2002 | Pontenzone et al. | 709/217 |
| 2003/0004791 A1 | 1/2003 | Kojima | |
| 2003/0005019 A1 | 1/2003 | Pabla et al. | |
| 2003/0014521 A1 | 1/2003 | Elson et al. | |
| 2003/0025650 A1 | 2/2003 | Uesaki et al. | |
| 2003/0037131 A1 | 2/2003 | Verma | |
| 2003/0061280 A1 | 3/2003 | Bulson et al. | |
| 2003/0061330 A1 | 3/2003 | Frisco et al. | |
| 2003/0071810 A1 | 4/2003 | Shoov et al. | |
| 2003/0086682 A1 | 5/2003 | Schofield et al. | |
| 2003/0115267 A1 | 6/2003 | Hinton et al. | |
| 2003/0167315 A1 | 9/2003 | Chowdhry | |
| 2003/0204566 A1 | 10/2003 | Dhupelia et al. | |
| 2004/0030787 A1 | 2/2004 | Jandel et al. | |
| 2004/0032424 A1 | 2/2004 | Florschuetz | |
| 2004/0039834 A1 | 2/2004 | Saunders et al. | |
| 2004/0054542 A1 | 3/2004 | Foote et al. | |
| 2004/0059941 A1 | 3/2004 | Hardman et al. | |
| 2004/0073629 A1 | 4/2004 | Bazot et al. | |
| 2004/0098754 A1 | 5/2004 | Vella et al. | |
| 2004/0103150 A1 | 5/2004 | Ogdon et al. | |
| 2004/0125877 A1 | 7/2004 | Chang et al. | |
| 2004/0143603 A1 | 7/2004 | Kaufmann et al. | |
| 2004/0148375 A1 | 7/2004 | Levett et al. | |
| 2004/0153504 A1 | 8/2004 | Hutchinson et al. | |
| 2004/0162787 A1 | 8/2004 | Madison et al. | |
| 2004/0167896 A1 | 8/2004 | Eakin | |
| 2004/0187140 A1 | 9/2004 | Aigner et al. | |
| 2004/0237120 A1 | 11/2004 | Lewin et al. | |
| 2004/0268224 A1 | 12/2004 | Balkus et al. | |
| 2005/0093860 A1 | 5/2005 | Yanagisawa et al. | |
| 2005/0138560 A1 | 6/2005 | Lee et al. | |
| 2005/0144258 A1 | 6/2005 | Burckart et al. | |
| 2005/0183143 A1 | 8/2005 | Anderholm et al. | |
| 2005/0204148 A1 | 9/2005 | Mayo et al. | |
| 2005/0212797 A1 | 9/2005 | Lee et al. | |
| 2006/0005114 A1 | 1/2006 | Williamson et al. | |
| 2006/0048058 A1 | 3/2006 | O'Neal et al. | |
| 2006/0129933 A1 | 6/2006 | Land et al. | |
| 2006/0150149 A1 | 7/2006 | Chandhoke et al. | |
| 2006/0265495 A1 | 11/2006 | Butler et al. | |
| 2006/0277553 A1* | 12/2006 | Henning et al. | 719/313 |
| 2007/0038931 A1 | 2/2007 | Allaire et al. | |
| 2007/0055401 A1 | 3/2007 | Van Bael et al. | |
| 2007/0121850 A1* | 5/2007 | Klos et al. | 379/114.28 |
| 2007/0174905 A1 | 7/2007 | Martherus et al. | |
| 2007/0192613 A1 | 8/2007 | Amoroso et al. | |
| 2007/0192727 A1 | 8/2007 | Finley et al. | |
| 2007/0211065 A1 | 9/2007 | Feth et al. | |
| 2007/0245243 A1 | 10/2007 | Lanza et al. | |
| 2007/0271367 A1 | 11/2007 | Yardeni et al. | |
| 2007/0282858 A1 | 12/2007 | Arner et al. | |
| 2008/0005240 A1 | 1/2008 | Knighton et al. | |
| 2008/0005247 A9 | 1/2008 | Khoo | |
| 2008/0062969 A1 | 3/2008 | Picard et al. | |
| 2008/0062970 A1 | 3/2008 | Picard et al. | |
| 2008/0109396 A1* | 5/2008 | Kacin | 707/1 |
| 2008/0189162 A1* | 8/2008 | Ganong | G06F 17/3089 705/7.13 |
| 2008/0235189 A1 | 9/2008 | Rayman et al. | |
| 2008/0270151 A1 | 10/2008 | Mahoney et al. | |
| 2009/0013244 A1 | 1/2009 | Cudich | |
| 2009/0019367 A1 | 1/2009 | Cavagnari et al. | |
| 2009/0066366 A1 | 3/2009 | Solomon | |
| 2009/0083641 A1 | 3/2009 | Christy | |
| 2009/0100372 A1 | 4/2009 | Lauridsen | |
| 2009/0133048 A1* | 5/2009 | Gibbs | G06F 17/30038 725/14 |
| 2009/0138508 A1 | 5/2009 | Tolle | |
| 2009/0187825 A1 | 7/2009 | Sandquist et al. | |
| 2009/0217187 A1 | 8/2009 | Kendall et al. | |
| 2009/0222842 A1 | 9/2009 | Narayanan et al. | |
| 2009/0259937 A1 | 10/2009 | Rohall et al. | |
| 2009/0292768 A1 | 11/2009 | Franke | |
| 2010/0023849 A1 | 1/2010 | Hakim et al. | |
| 2010/0037205 A1 | 2/2010 | Maillot et al. | |
| 2010/0192132 A1 | 7/2010 | Yuan | |
| 2010/0216443 A1 | 8/2010 | Jacobstein et al. | |
| 2010/0277696 A1 | 11/2010 | Huebner | |
| 2010/0325674 A1 | 12/2010 | Lliu | |
| 2011/0082719 A1 | 4/2011 | Dutta | |
| 2011/0252094 A1 | 10/2011 | Sahasi et al. | |
| 2012/0158902 A1 | 6/2012 | Udtke et al. | |
| 2012/0226984 A1 | 9/2012 | Bastide et al. | |
| 2012/0254454 A1 | 10/2012 | Margush et al. | |
| 2012/0290950 A1 | 11/2012 | Rapaport et al. | |
| 2013/0132374 A1 | 5/2013 | Olstad et al. | |

(56) References Cited

U.S. PATENT DOCUMENTS

| | | |
|---|---|---|
| 2013/0268872 A1 | 10/2013 | Yin et al. |
| 2014/0123014 A1 | 5/2014 | Keen |
| 2014/0126714 A1 | 5/2014 | Sayko et al. |
| 2014/0126715 A1 | 5/2014 | Lum et al. |
| 2014/0214691 A1 | 7/2014 | Morris, III |
| 2014/0237381 A1 | 8/2014 | Socolof |
| 2014/0279049 A1 | 9/2014 | Wiseman |
| 2014/0289326 A1 | 9/2014 | McCormack et al. |
| 2014/0366098 A1 | 12/2014 | Savage et al. |
| 2015/0002619 A1 | 1/2015 | Johnston et al. |
| 2015/0213145 A1 | 7/2015 | Baldwin |
| 2015/0304367 A1 | 10/2015 | Chan et al. |
| 2015/0365244 A1 | 12/2015 | Schmiltz et al. |
| 2016/0011729 A1 | 1/2016 | Flores et al. |

OTHER PUBLICATIONS

Guthery, S., Kehr, R., and Posegga, J. 2001, How to turn a GSM SIM into a web server, In Proceedings of the Fourth Working Conference on Smart Card Research and Advanced Applications on Smart Card Research and Advanced Applications (Bristol, United Kingdom). J. Domingo-Ferrer, D. Chan, and A. Watson, Norwell, MA.

Holmberg, et al., "Web Real-Time Communication Use Cases and Requirements"; dated Mar. 2015 (29 pgs.).

Draft -C. Holmberg, et al., "Web Real-Time Communication Use Cases and Requirements"; dated Oct. 14, 2013 (25 pgs.).

Saint-Andre, P. 2005. Streaming XML with Jabber/XMPP. IEEE Internet Computing 9, 5 (Sep. 2005).

Sen, Sandip, An Automated Distributed Meeting Scheduler,PSU, Apr. 2007; http://citeseerx.ist.psu.edu/viewdoc/summary?doi=10.1.1.26.6862 (13 pgs.)

Sinha, et al., Video Conferencing System, Columbia University, http://www.cs.columbia.edu/~sedwards/classes/2009/4840/reports/RVD-presentation.pdf (11 pgs.).

Best practices in Webcasting for Publishing; Author: ON24, Publication: 2006.

NPL#1, UoW-EauClaire Microsoft PowerPoint 2003, Sep. 2004, http://web.archive.org/web/20040919191008/http://www.uwee.edu/help/ppoint03.htm archived: Sep. 19, 2004, Printed: Jan. 10, 2008.

NPL#1a, UoW-EauClaire Microsoft PowerPoint 2003, Dec. 2004, http://web.archive.org/web/20041221201404/www.uwee.edu/help/PPoint03/webenvir.htm archieved: Dec. 21, 2004, printed: Jan. 10, 2008.

NPL#2, Microsoft Corporation, Oct. 2004, COM: Component Object Model Technologies, http://web.archive.org/web/20041023025124/http://www.microsoft.com/com/default.mspx , archived: Oct. 23, 2004, printed: Jan. 10, 2008.

Rothgaqnger, Fred—3D Object Modeling and Recognition Using Local Affine-Invariant Image Descriptors and Multi-View Spatial Constraints—Fred Rothganger and Svetlana Lazebnik; Jean Ponce—Department of Computer Science and Beckman Institute, University of Illinois-Cordelia Schmid Inria, France-International Journal of Computer Vision 66(3), 231-259, 2006.

Papadakis, P. et al Efficient 3D shape matching and retrieval using a concrete radialized spherical projection representation—Panagiotis Papadakis, Ioannis Pratikakis, Stavros Perantonis, Theoharis Theoharis—Greece—Pattern Recognition 40 (2007)—ScienceDirect.

* cited by examiner

SYSTEM AND METHOD FOR DEBUGGING OF WEBCASTING APPLICATIONS DURING LIVE EVENTS

FIELD

This invention relates generally to the field of software development, and more particularly to the debugging of webcasting applications.

BACKGROUND

Currently, it is typical that the inner workings of a software program contains errors inside of a large datapaths, statepaths, or userpaths. To identify these errors, points of interest in the system process must be identified. There are usually many different procedures in the software's source code that perform actions necessary for a single feature to operate, and each of these procedures needs to be inspected when a feature malfunctions. The person attempting to fix the error is frequently faced with a problem of having either too many debugging inspectors exposed, extending the time required to identify the points of interest among the mass of information, or too few debugging inspectors exposed, which does not give enough information to identify the points of interest.

As the complexity of a software program increases, the amount of time that it takes an author to identify a bug increases quickly because there are more combinations of points of interest that the person searching for the error must parse through. This is a common debugging problem generally known as information overload.

There are several common debugging techniques to report software artifacts for the purpose of identifying points of interest in software. Some of those techniques include adding tracers inside the source code that output specific information that they believe can lead to identifying points of interest in the software; setting up a variable watch list that outputs the current value or values of internal data structure instances; setting up break points that causes the code to stop at selected points during the execution, enabling the developer to review the artifacts and choose the next debugging action one step at a time; and viewing a stack trace that shows the current hierarchy of procedures that are executing during a break point. These techniques can be very time consuming, and frequently cause some errors to hide the existence of other errors, adding to the time required to fix errors. They additionally are frequently used in "debug builds" and not in "release builds". Thus, once the build has gone to production, the developer loses the ability to debug the application.

When software is used to run a live, massively multi-user event such as webcasting and virtual tradeshows, it is a critical to monitor and fix problems immediately, and before the conclusion of the limited time event. This requires that no slowdown is caused by information overload, and no slowdown is caused by a communications bottleneck in gaining useful information about useful software artifacts. It also does not allow for the use of separate release builds, or any of the time intensive methods of the debug systems listed above.

DETAILED DESCRIPTION OF ONE OR MORE PREFERRED EMBODIMENTS

The system and method are is particularly applicable to a multi-user webcast system in which time constraints and large numbers of users make real time or near real time recovery and correction from errors desirable while maintaining as seamless of a user experience as possible, and it is in this context that the system and method will be described.

Figure 1:
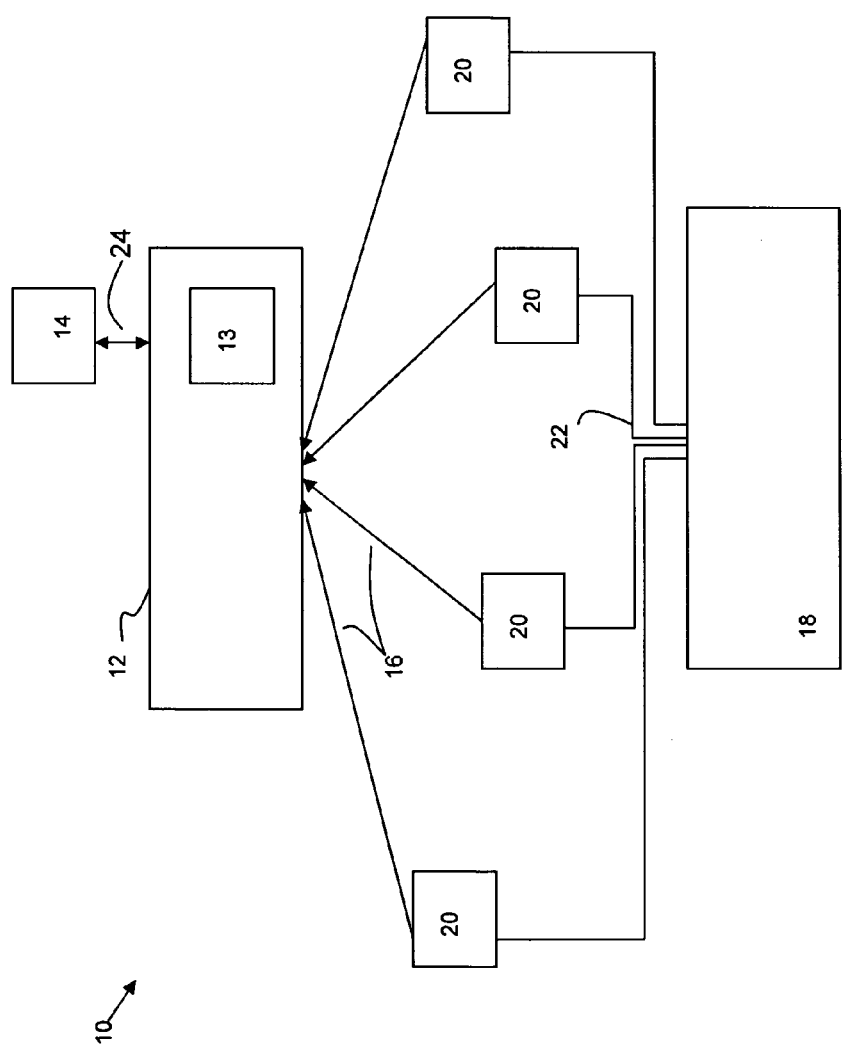
FIG. 1 illustrates a multi-user broadcast system incorporating a web-casting debugging method.

FIG. 1 is a diagram illustrating a webcasting system 10 which includes real time debugging. The system includes one or more devices 20 which communicate action log data for the device via a log communication link 16 to a monitoring unit 12. The monitoring unit 12 stores the action log data in an artifact log 13. The system may also include distribution unit 18 which communicates webcast presentation data to the devices 20 via a broadcast link 22. Finally, the system includes a datagrid display 14 which displays artifact log data from the monitoring unit 12 via display communication link 24.

Device 20 may be anything capable of receiving information from distribution unit 18. Device 20 may be a wired or wireless phone, a personal computer, a server, a virtual device such as a computer emulator, or a handheld computing device.

Monitoring unit 12 may be anything capable of receiving the action log data. This may be a 3 tier server, a workstation computer, a distributed storage network, or a custom computing device.

The action log data for each device 20 will comprise structures or lines of data that include information on an action or code execution performed by a specific code module. The action log data for each action or code execution may include a time stamp; and application ID; a version ID; a user ID; a session ID; a category, class and type of the code module that executed the action; and a description of the code execution. Because each code module will contain this information in a format that allows it to be reported out to the artifact log, this data and information may also serve a double purpose as the commenting or description of the code that makes the program readable.

Log communication link 16 and broadcast link 22 may be the same communication path, or they may be different communication paths. They may include communication over the internet, or via a wired or wireless local area network, or a wide area network. Similarly, monitoring unit 12 and distribution unit 18 may be different servers, or they may be the same server if load conditions allow.

The monitoring unit 12 stores action log data in the artifact log 13. The artifact log 13 can hold data using any method or apparatus capable of being able to organize, sort, and retrieve the data in real time as a multi-user webcast is occurring. For example, the artifact log 13 may be an indexed database. The monitoring unit 12 has a suite of applications that enable different teams to view information from all of the log entries.

Distribution server 18 will preferably be a typical three tier server, but may be any server capable of transmitting information for a webcast/presentation to client systems 20. A detailed example of one embodiment of broadcast server is shown as distribution server 54 in FIG. 2.

Figure 2:
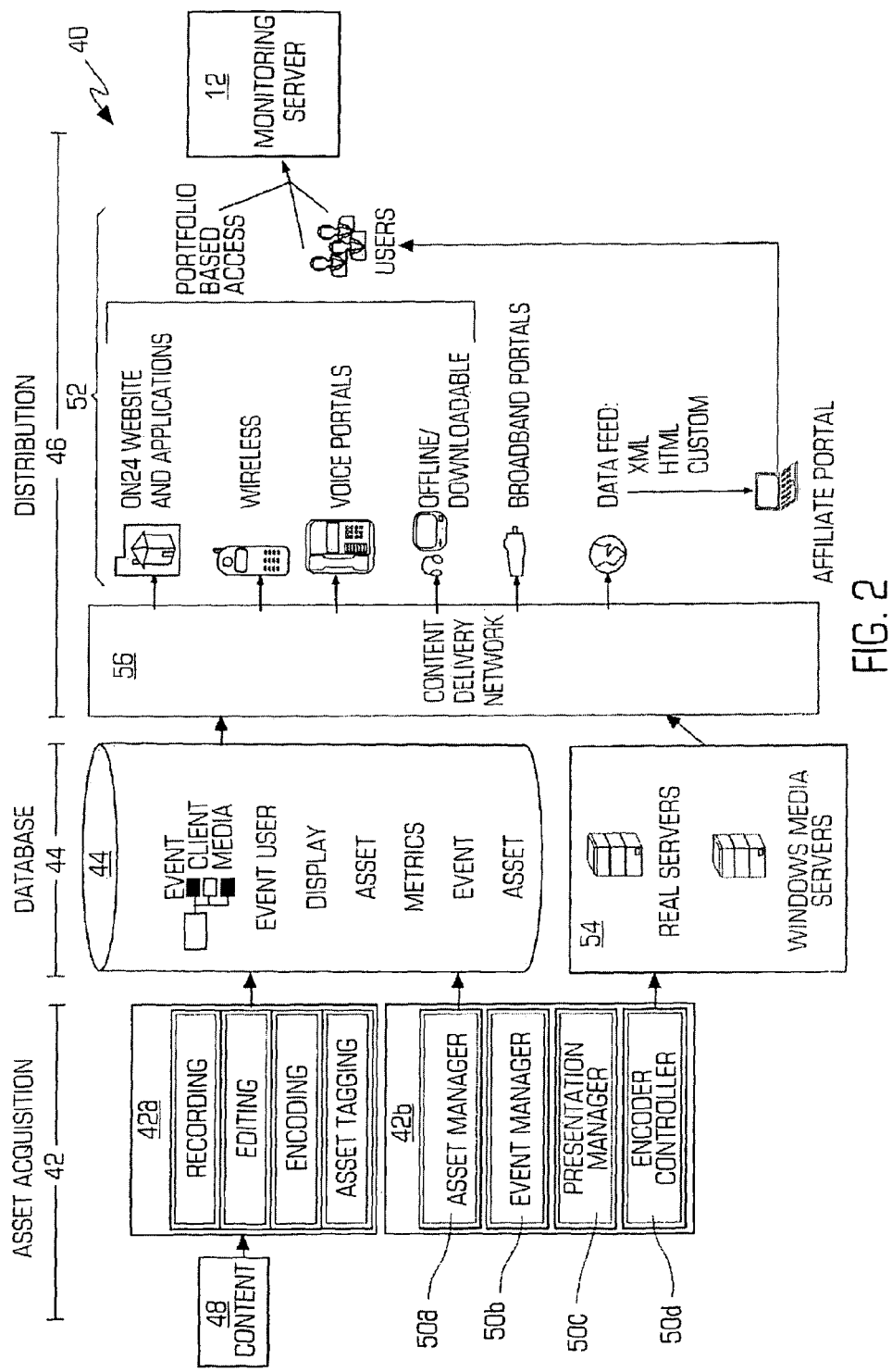
FIG. 2 describes a webcasting system that includes an embodiment of a webcast debug system.

FIG. 2 is a diagram illustrating a webcasting system 40 that includes the debugging system. The web casting system 40 may comprise an asset acquisition and event management portion 42a, a database portion 44 and a distribution portion 46 wherein a piece of media/content 48 is input into the web casting system 40 in order to distribute that content/piece of media during a web cast. Generally, each element of the web casting system being described is implemented in software wherein each portion may be one or more software modules and each software modules may be a plurality of computer instructions being executed to perform a particular function/operation of the system. Each element of the system may thus be implemented as one or more computer resources, such as typical personal computers, servers or workstations that have one or more processors, persistent storage devices and memory with sufficient computing power in order to store and execute the software modules that form the web casting system in accordance with the invention. The web casting may generate a webcast that is provided to one or more webcast clients 52 wherein each client is a computing resource, such as a personal computer, workstation, cellular phone, personal digital assistant, wireless email device, telephone, etc. with sufficient computing power to execute the web casting client located on the client wherein the client communicates with the web cast system over a wired or wireless connection.

The event manager module 42b further comprises an asset manager module 50a, an event manager module 50b, a presentation manager module 50c and an encoder controller 50d. The asset manager module 50a, prior to a webcast, imports/exports content/pieces of media into/from a library of media as needed and manages the assets for each webcast presentation. The event manager module 50b may perform actions/function prior to and after a webcast. Prior to a particular webcast, the event manager module may reserve the event in the system (both resources and access points), set-up an event console which a user interacts with to manage the webcast and then send messages to each recipient of the upcoming webcast with the details of how to access/operate the webcast. After a particular webcast, the event manager module 50b may permit a user to import an old webcast presentation into the system in order to re-use one or more pieces of the old webcast presentation. The presentation manager module 50c, during a particular webcast presentation, generates a webcast file with the slides of the webcast presentation, URLs and polls to an encoder controller to distribute the particular webcast presentation to the users. The encoder controller 50d encodes the webcast presentation stream to one or more distribution server 54 that distributes the webcast presentation to the users.

As shown in FIG. 2, the database 44 may include data about each event/webcast, including the clients to which the web cast is being provided and the media associated with the webcast, one or more event users, the display of the particular event, the assets associated with the event, the metrics for the event and other event data. In combination with this data in the database for a particular event, operations and commands from the event manager module 42b are downloaded to the distribution servers 54 that distribute each event to each client 52 for the particular event over a distribution network 56. As shown, the webcast event/presentation may be distributed to one or more different clients 52 that use one or more different methods to access the event/webcast. During the web cast event/presentation, the clients 52 execute web cast software that incorporates an embodiment of the present invention. During the web cast, for actions executed by on clients 52 by client software, action log data is created and sent to monitoring unit 12.

Figure 3:
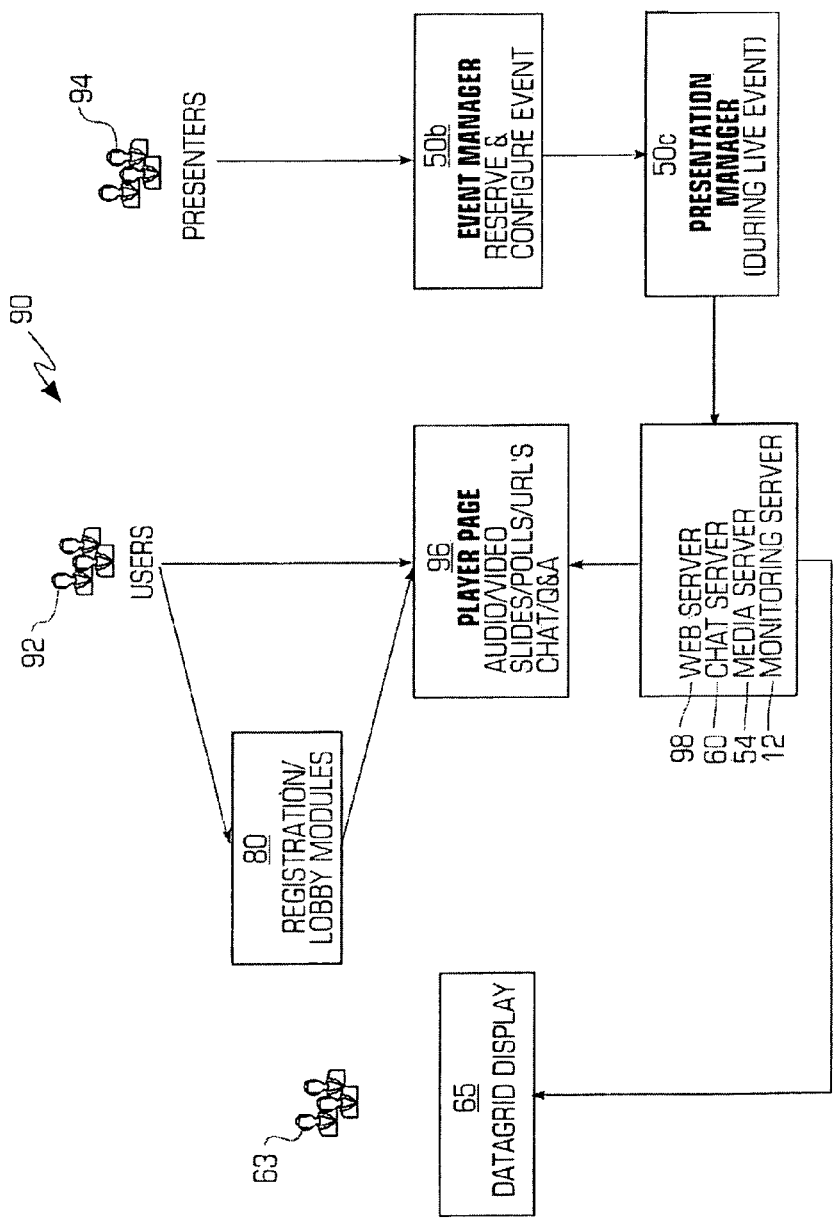
FIG. 3 is an illustration of a webcast center for use in a multi-user webcasting system.

FIG. 3 is a diagram illustrating a webcast center 90 that may be utilized by one or more users 92 that are presented with a presentation by the system and one or more presenters 94 who utilize the system to present presentations to the users 92. The users 92 may interact with a registration and lobby modules 80 that permit the users to register with the system and schedule a 5 presentation to view. In response to a successful registration, the user may be presented with a player page 96, such as a web page provided to a client computer of the user, that provides the audio and visual data for the presentation, slides, polls and URLs for the presentation, chat sessions and question and answers for a particular presentation. The data in the player page 96 is provided by the web server 60, the distribution server 54 and a chat server 98 that provides the chat 10 functionality for a presentation. The presentation data for a live event presentation is provided to the servers 54, 60 and 98 by the presentation manager module 50c. The presenters 94 may utilize the event manager module 50b to reserve an event and/or configure an event. Once the event is reserve and configured, the presentation data is forwarded to the presentation manager module 50c.

During the event window when users 92 are interacting with the registration and lobby modules 80 and player page 96, the systems being used by users 92 to interact are executing code modules which take actions. The actions, according to the present invention, create action log data which is transmitted to monitoring unit 12. During the event window, customer support personnel 93 are on hand to deal with any problems or errors that occur during the web cast event/presentation. Customer support personnel 93 may include customer service representatives, debug engineers, developers, or other people to assist in the repair of errors. During the event window, these people monitor the system by viewing action log data on datagrid display 95. In the event of an emergency application failure during a live multi-user event, Customer support personnel 93 are able to access filtered and organized data. Because the fields contain specific and comprehensive information about every relevant action in the source code, the precise cause of the problem is more likely to be found faster.

Figure 4:
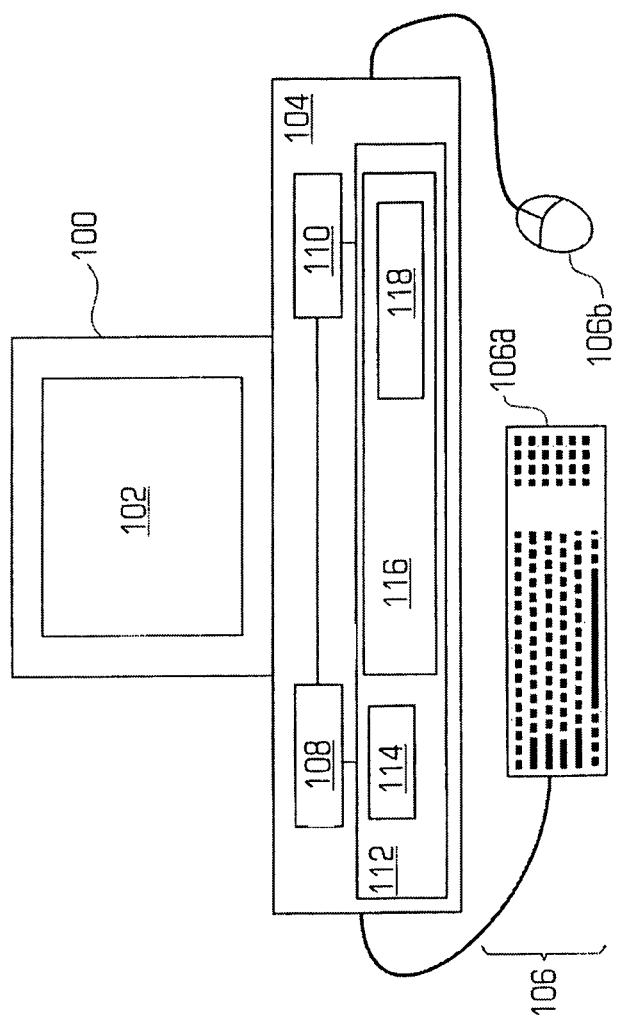
FIG. 4 is an illustration of a webcast client.

FIG. 4 is a diagram illustrating an example of a webcast client 100 in accordance with the invention that may incorporate the debug system. The webcast client 100 may be implemented as a personal computer, workstation, PDA, cellular phone and the like with sufficient computing power to implement the functions of the client as described below. In the example shown in FIG. 6, the webcast client may be a typical personal computer that may further comprise a display unit 102, such as a CRT or liquid crystal display or the like, a chassis 104 and one or more input/output devices 106 that permit a user to interact with the client 100, such as, for example, a keyboard 106a and a mouse 106b. The chassis 104 may further include one or more processors 108, a persistent storage device 110, such as a hard disk drive, optical disk drive tape drive, etc., and a memory 112, such as SRAM, DRAM or flash memory. In a preferred embodiment, the client is implemented as one or more pieces of software stored in the persistent storage device 110 and then loaded into the memory 112 to be executed by the processor (s) 108. The memory may further include an operating system 114, such as Windows, and a typical browser application 116, such as Microsoft Internet Explorer or Netscape Navigator and a webcast module 118 (including a slide, polls, survey, URL, Q&A and a transcript synchronization module) that operates within the browser application. In a preferred embodiment, the webcast module 118 may further comprise a plurality of computer instructions, such as Java code, that implement the client side of the webcast presentation. In accordance with an embodiment of the invention, the client side of the system/apparatus may be implemented as Java code that is downloaded/streamed to the client 100 during/prior to each presentation so that the synchronization of the assets does not require separate client software downloaded to the client.

Figure 5:
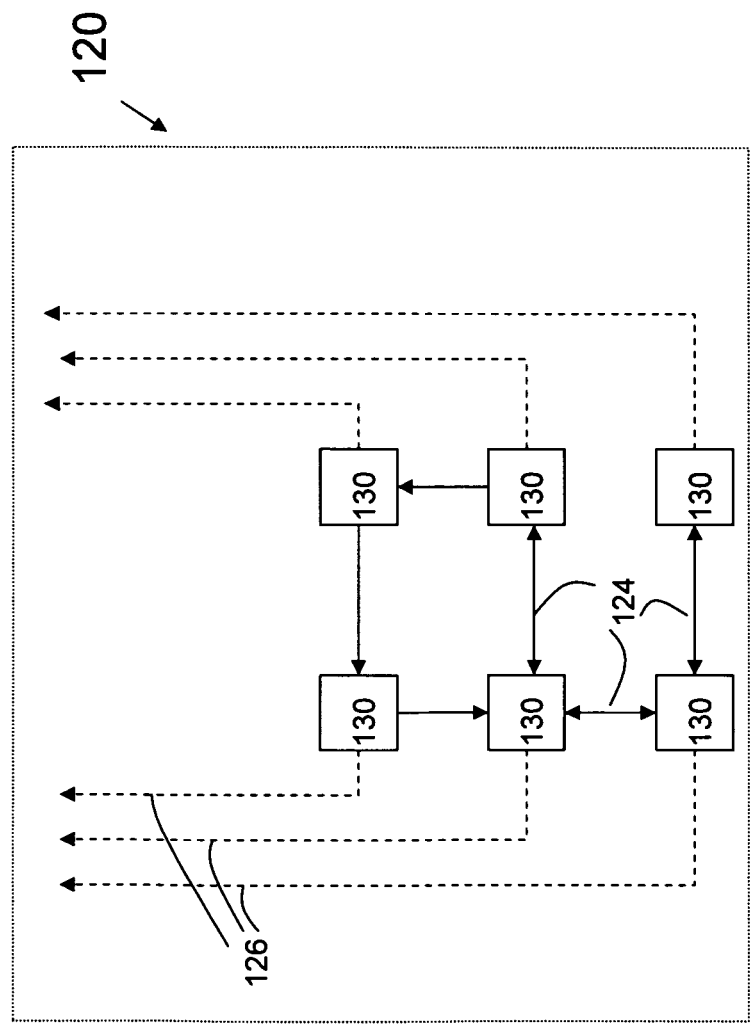
FIG. 5 is a diagram illustrating a single client application in which the executions of the debugging system operate.

FIG. 5 is a diagram illustrating the operation of a single client system 120. Client 120 of FIG. 5 may be equivalent to one of the devices 20 of FIG. 1.

In FIG. 5, client system 120 transmits log data via log communication link 126. The customer system 120 includes one or more code modules 130. The individual code modules 130 communicate with each other via data flow paths 124 and create the action log data that is sent over log communication link 126.

Figure 6:
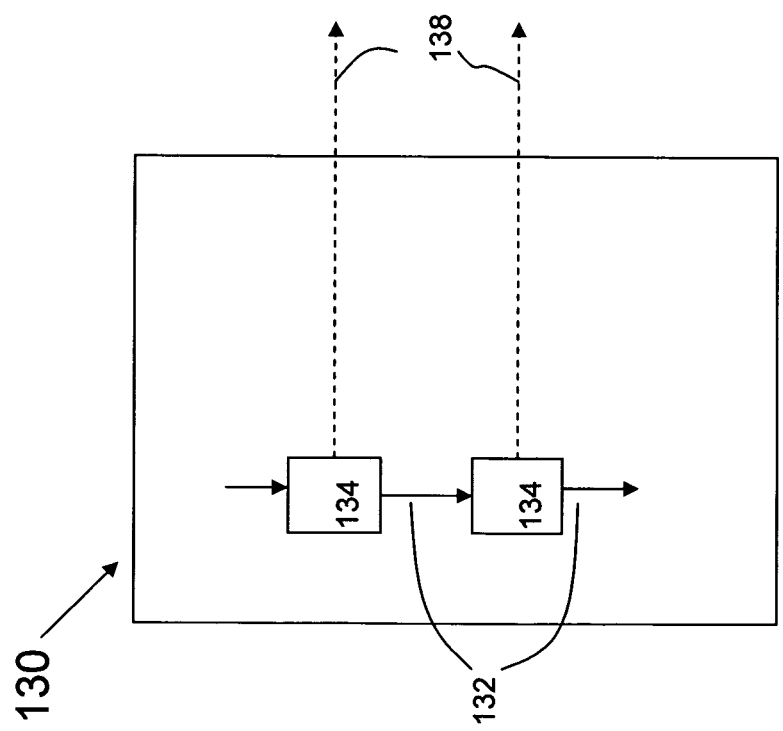
FIG. 6 illustrates a client application execution including an embodiment of the debug system.

FIG. 6 is a diagram illustrating the operation of a single code module 130. The code module 130 may be part of a client system such as the one shown in FIG. 5. In FIG. 6, each code module performs actions 132. Each action 132 creates log data 134 which is communicated to monitoring station 136 via log communication link 138.

Figure 7:
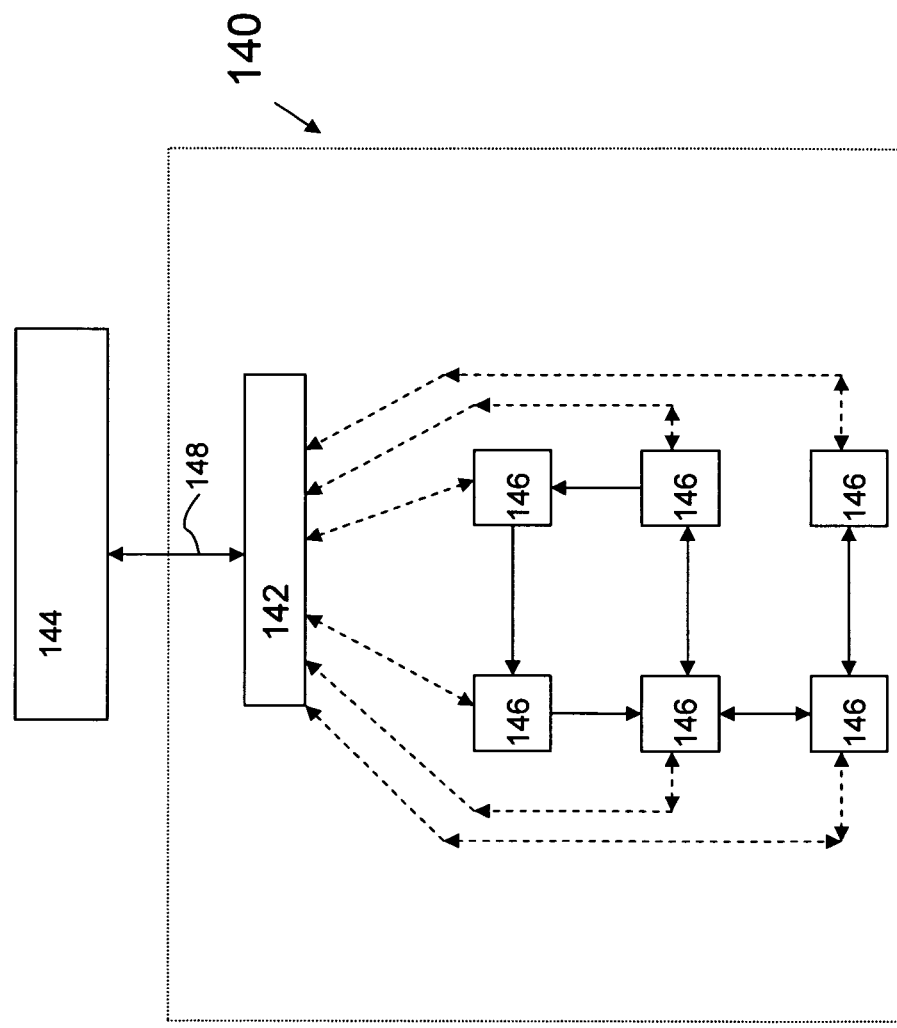
FIG. 7 illustrates a library debug apparatus.

One embodiment, shown in FIG. 7, includes a library debug apparatus 142. In this embodiment, the action log data is created by code modules 146 inside of device 140 and transmitted to a monitoring unit 144 in the following fashion. The device-side application's source code is written such that all classes or code modules 146 use a library debug apparatus 142. Typically the code modules 146 follow a standard Model-View-Controller-Delegate Service ("MVCDS") model. Every code module 146 in the device 140 registers itself to the library debug apparatus 142 and receives a token identifying its category and class name. Each code module 146 contains reference identifiers that identify the type and description of the class, any actions that can be taken by the class, and other potentially useful debug information. Upon receiving a log dispatch command, the library debug apparatus 142 sends a completed packet to a monitoring unit 144 vial library log communication link 148.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A web cast debugging system implemented on a computer system, comprising:
   a computer system having a processor and a memory in which a plurality of code modules are stored in the memory and communicate with each other and are executed by the processor;
   one of the plurality of code modules configured to create an action data log line following the completion of an action performed by the code module, the action data log line comprising information on one of an action and a code execution performed by the one code module;
   wherein the code module transmits the action data log line to an artifact log; and
   a data grid display that receives the action data log line for real time monitoring of errors described in the action data log line during a multi-user web cast.

2. The web cast debugging system of claim 1 wherein the code module transmits the action data log line to the artifact log by sending the action data log line to a library apparatus; and the library apparatus transmits the action data log line to the artifact log.

3. The web cast debugging system of claim 2 wherein the library apparatus transmits the action data log line to the artifact log in response to a log dispatch command received by the library apparatus.

4. The system of claim 3 wherein the debug data stored in the code module includes category data and class data received by the code module from a library debug apparatus upon registration of the code module with the library debug apparatus.

5. The web cast debugging system of claim 1 wherein the action data log line includes data for describing the action by the code module including one or more of an execution time stamp, an application ID; a version ID; a user ID; a session ID, a category, a class, a type of the code module that executed the action; and a description of the code execution.

6. The system of claim 1 wherein the debug data stored in the code module includes category data and class data received by the code module from a library debug apparatus upon registration of the code module with the library debug apparatus.

7. A webcast debugging method implemented on a computer system having a processor and a memory, the method comprising:
   storing, in the memory, debug data in a code module contained within a processor;
   transmitting, via the processor, the debug data from the code module to an artifact log when the code module executes an action during a web cast event, artificial log comprising information on one of an action and a code execution performed by the code module; and
   sorting, via the processor, and viewing the debug data in the artifact log using a datagrid interface during the webcast event.

8. The method of claim 7 wherein the debug data stored in the code module includes category data and class data received by the code module from a library debug apparatus upon registration of the code module with the library debug apparatus.

9. A webcast debugging method implemented on a computer system having a processor and a memory, the method comprising:
   storing, in the memory, debug data in a code module contained within a processor;
   transmitting, via the processor, debug data from the code module to a debug library apparatus when the code module executes an action during a web cast event, the debug data comprising information on one of an action and a code execution performed by the one code module;
   transmitting, via the processor, debug data from the debug library apparatus to an artifact log in response to a log dispatch command received by the debug library apparatus; and sorting and viewing the debug data in the artifact log, stored in a monitoring unit, using a datagrid interface during the webcast event.

10. The method of claim 9 further comprising:
transmitting, via the code module, the action data log line to the artifact log by sending the action data log line to a library apparatus; and
transmitting, via the library apparatus, the action data log line to the artifact log.

11. The method of claim 9 further comprising:
transmitting, via the library apparatus, the action data log line to the artifact log in response to a log dispatch command received by the library apparatus.

12. The method of claim 9 wherein the debug data stored in the code module includes category data and class data received by the code module from a library debug apparatus upon registration of the code module with the library debug apparatus.

13. The method of claim 12 further comprising:
transmitting, via the code module, the action data log line to the artifact log by sending the action data log line to a library apparatus; and
transmitting, via the library apparatus, the action data log line to the artifact log.

14. The method of claim 12 further comprising:
transmitting, via the library apparatus, the action data log line to the artifact log in response to a log dispatch command received by the library apparatus.

* * * * *